(12) United States Patent
Wei et al.

(10) Patent No.: US 6,246,578 B1
(45) Date of Patent: Jun. 12, 2001

(54) COMPUTER-DEDICATED AUXILIARY DATA ACCESS DEVICE

(76) Inventors: Tzu Hsiang Wei; Kevin Alexander Chen, both of P. O. Box 63-150, Taichung City (406) (TW)

( * ) Notice: Subject to any disclaimer, the term of this patent is extended or adjusted under 35 U.S.C. 154(b) by 0 days.

(21) Appl. No.: 09/491,477

(22) Filed: Jan. 23, 2000

(51) Int. Cl.$^7$ ........................................... G06F 1/16
(52) U.S. Cl. .................. 361/686; 361/724; 361/726; 439/928
(58) Field of Search .................. 361/686, 683, 361/724, 727; 710/102; 439/67, 77, 945, 928, 928.1; 364/708.1

(56) References Cited

U.S. PATENT DOCUMENTS

| | | | |
|---|---|---|---|
| 5,408,386 | * 4/1995 | Ringer et al. | 361/785 |
| 6,125,034 | * 9/2000 | Bovio et al. | 361/686 |
| 6,137,688 | * 10/2000 | Borkar et al. | 361/753 |

* cited by examiner

*Primary Examiner*—Leo P. Picard
*Assistant Examiner*—Hung Van Duong

(57) ABSTRACT

A computer-dedicated auxiliary data access device comprised of a device case having a minimum of one horizontal slot in the front side and, furthermore, a housing cavity perpendicularly formed inward beyond the horizontal slot, a universal serial bus interface socket installed at the end section of the housing cavity, an IC circuit board disposed in parallel alignment with the horizontal slot, a card terminal connector respectively situated at the end face of the IC circuit board, and a number of perpendicularly supportive spring contacts of the card terminal connector that are connected via a flat cable routed to the interface socket. The horizontal slot provides for the sideways insertion of an ultra thin flat memory card, with the memory card internally consisting of high-speed flash memory chips and also including a main controller IC and a memory IC which have a read/write specification of 10,000 times to enable the rapid reading and writing of data. An exposed read access area is formed in the top of memory card that is in parallel alignment with the card terminal connector, the read access area consisting of an elastically loaded plurality of contacts intervallicly disposed that enable perpendicular mutual engagement. A transmission cable is installed to interface socket and the other end is installed to the USB port of a computer. As such, the present invention achieves computer-dedicated high speed and high capacity auxiliary memory access operations, while providing for convenient portability.

3 Claims, 4 Drawing Sheets

COMPUTER-DEDICATED AUXILIARY DATA ACCESS DEVICE

BACKGROUND OF THE INVENTION

1) Field of the Invention

The invention herein relates to a computer peripheral, specifically a computer-dedicated auxiliary data access device.

2) Description of the Prior Art

In present day computer processing, in addition to the memory components internally installed on the mainboard and the connected hard disk drives that handle repeated data reading and writing operations, other computer peripherals also installed include auxiliary data access devices such as floppy diskette drives and optical disk drives. Referring to FIG. 1, the most widely utilized such device is the floppy diskette drive 1 into which is inserted a magnetic media in the form of a circular plastic platter 2 encased in a protective plastic jacket 3 (having a thickness of 0.2 to 0.3 cm and width of 9 to 13.3 cm) and analogous with magnetic tape, since principles of magnetism are utilized to store data via a read-write head 1a inside the floppy diskette drive 1, there is no substantial difference between the said type of read-write head 1a and a tape recorder play/record head; since the storage capacity of a typical magnetic diskette is limited, the storage of larger quantities of data is accomplished by utilizing a number of magnetic diskettes, with excessively large batches of data such as graphics files being impossible to archive; even if replaced by a double-sided high-density diskette drive and the compatible double-sided high-density diskettes to obtain a memory capacity of 1.2 MB, the storage of enormous graphics files cannot be achieved in a single access: as a result, the utilization of the said device is extremely impractical. Furthermore, as more magnetic diskettes are purchased for use, the total number of archived material increases continually, with their rather sizable physical dimensions (measuring 0.2 to 0.3 cm thick and 9 to 13.3 cm in width) not only creating considerably troublesome storage management problems, but also resulting in portability inconveniences.

Optical disk drives 4 are considered applications of laser technology, but the reading and writing operations in the optical disk drive 4 do not require a read-write head to accomplish because data is read and written by the two different laser beams, with the storage layer on the optical disk 5 capable of various material changes in response to laser light exposure; since laser beams can be focused to occupy relatively minute surface areas, the capacity of an optical disk 5 is often quite immense, with a 12-inch optical disk 5 capable of storing four gigabytes of data; therefore, a 12-inch optical disk 5 can replace 100 40 MB hard disk drives; generally speaking, while the data storage density available on the optical disk 5 is approximately 40 times higher than that of a conventional magnetic diskette, such storage approaches have not become widespread due to the exorbitant prices of read/write-capable optical disk drives 4; as a result, most optical disk drives 4 today only are read-only units that have no built-in write capability, with data write-in requiring a separate write-capable optical disk drive (not shown in the drawings) utilizing laser fusion recording technology; however, the high archiving error rate of such a complex storage technology makes this approach rather impractical.

In view of the said shortcomings, the inventor of the invention herein, based on many years of experience in the production and marketing of this category of products, conducted extensive research and testing, which finally culminated in the development of the practical invention herein.

SUMMARY OF THE INVENTION

The primary objective of the invention herein is to provide a computer-dedicated auxiliary data access device capable of achieving rapid auxiliary memory performance, high capacity access operations, a significantly prolonged service life and, furthermore, excellent storage and portability.

Therefore, the computer-dedicated auxiliary data access device of the invention herein is comprised of a device case having a minimum of one horizontal slot in the front side and, furthermore, a housing cavity perpendicularly formed inward beyond the said horizontal slot, a universal serial bus (USB) interface socket installed at the end section of the said housing cavity, an IC circuit board disposed in parallel alignment with the said horizontal slot, a card terminal connector respectively situated at the end face of the said IC circuit board, and a number of perpendicularly supportive spring contacts of said card terminal connector that are connected via a flat cable routed to the interface socket; the said horizontal slot provides for the sideways insertion of an ultra thin flat memory card; the said memory card internally consists of high-speed flash memory chips and also includes a main controller IC and a memory IC which have a read/write specification of 10,000 times to enable the rapid reading and writing of data; an exposed read access area is formed in the top of the said memory card that is in parallel alignment with the said card terminal connector, the read access area consisting of an elastically loaded plurality of contacts intervallicly disposed that enable perpendicular mutual engagement; a transmission cable is installed to said interface socket and the other end installed to the USB port of a computer; as such, the present invention achieves computer-dedicated high speed and high capacity auxiliary memory access operations, while providing for convenient portability and maintenance.

To enable the examination committee to further understand the objectives, innovations, and advantages of the invention herein, the brief description of the drawings below is followed by the detailed description of the preferred embodiments.

DETAILED DESCRIPTION OF THE PREFERRED EMBODIMENTS

Figure 1:
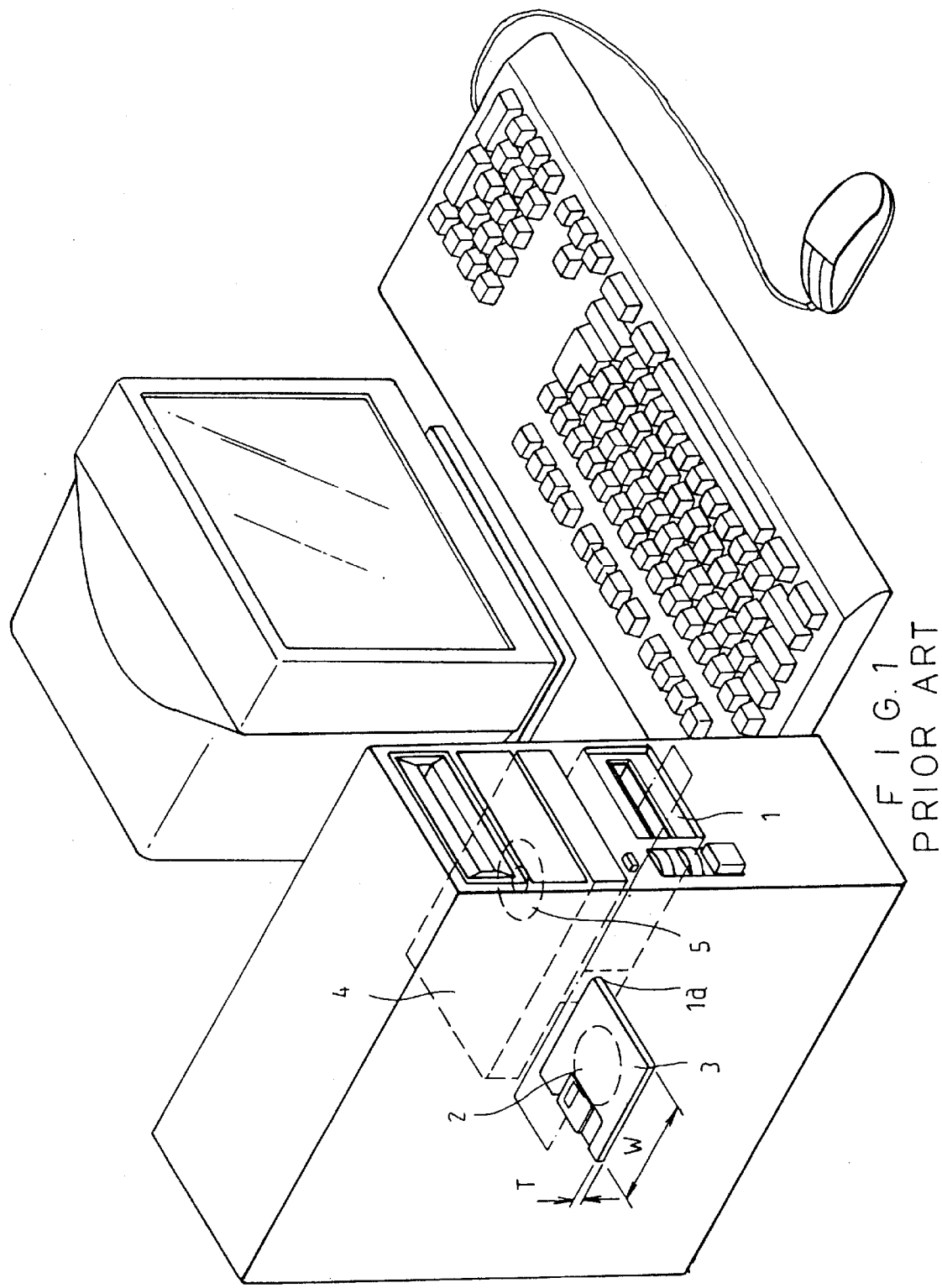
FIG. 1 is an isometric drawing of a conventional computer peripheral auxiliary data access equipment structure.
Figure 2:
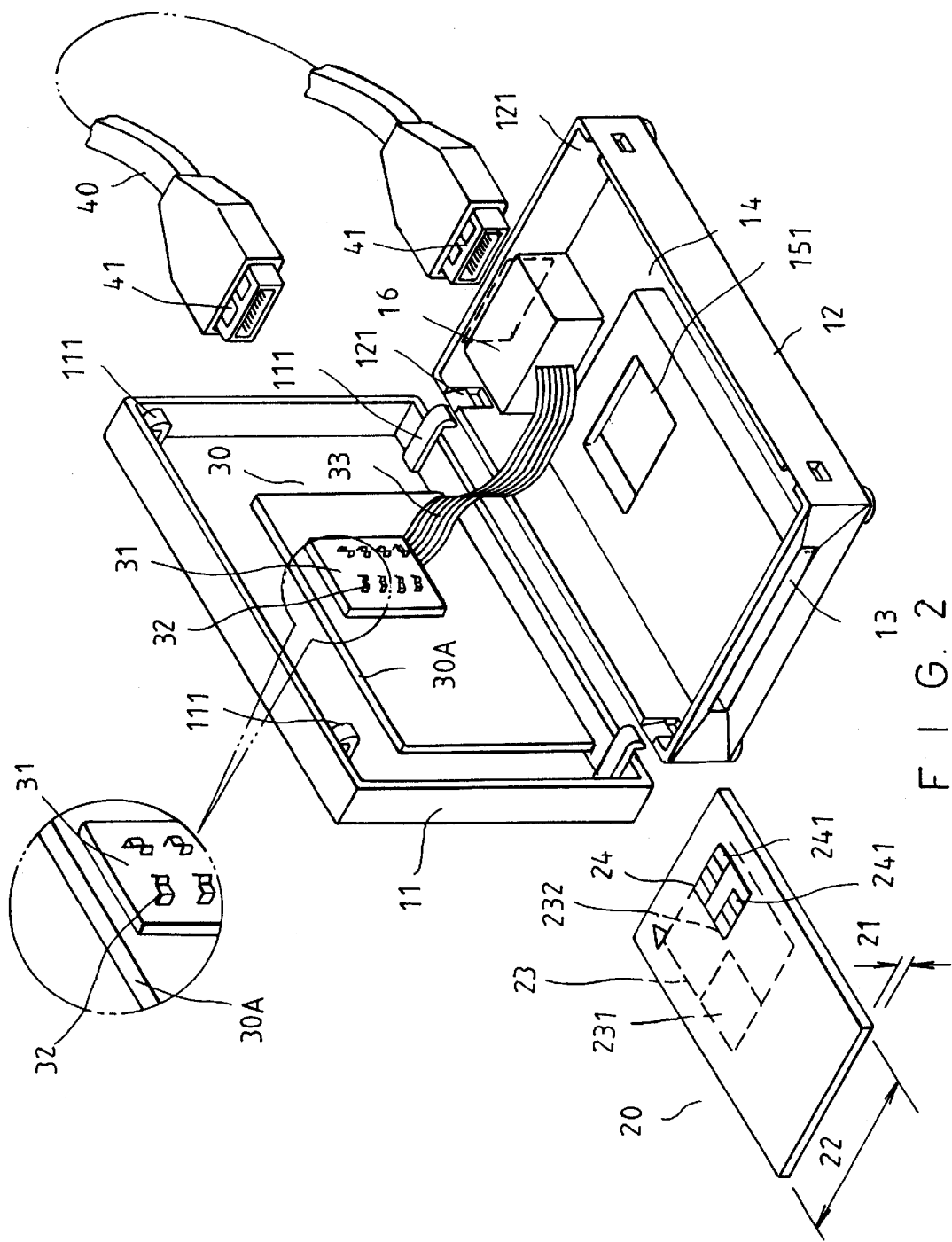
FIG. 2 is an exploded drawing of the most preferred embodiment of the invention herein.
Figure 3:
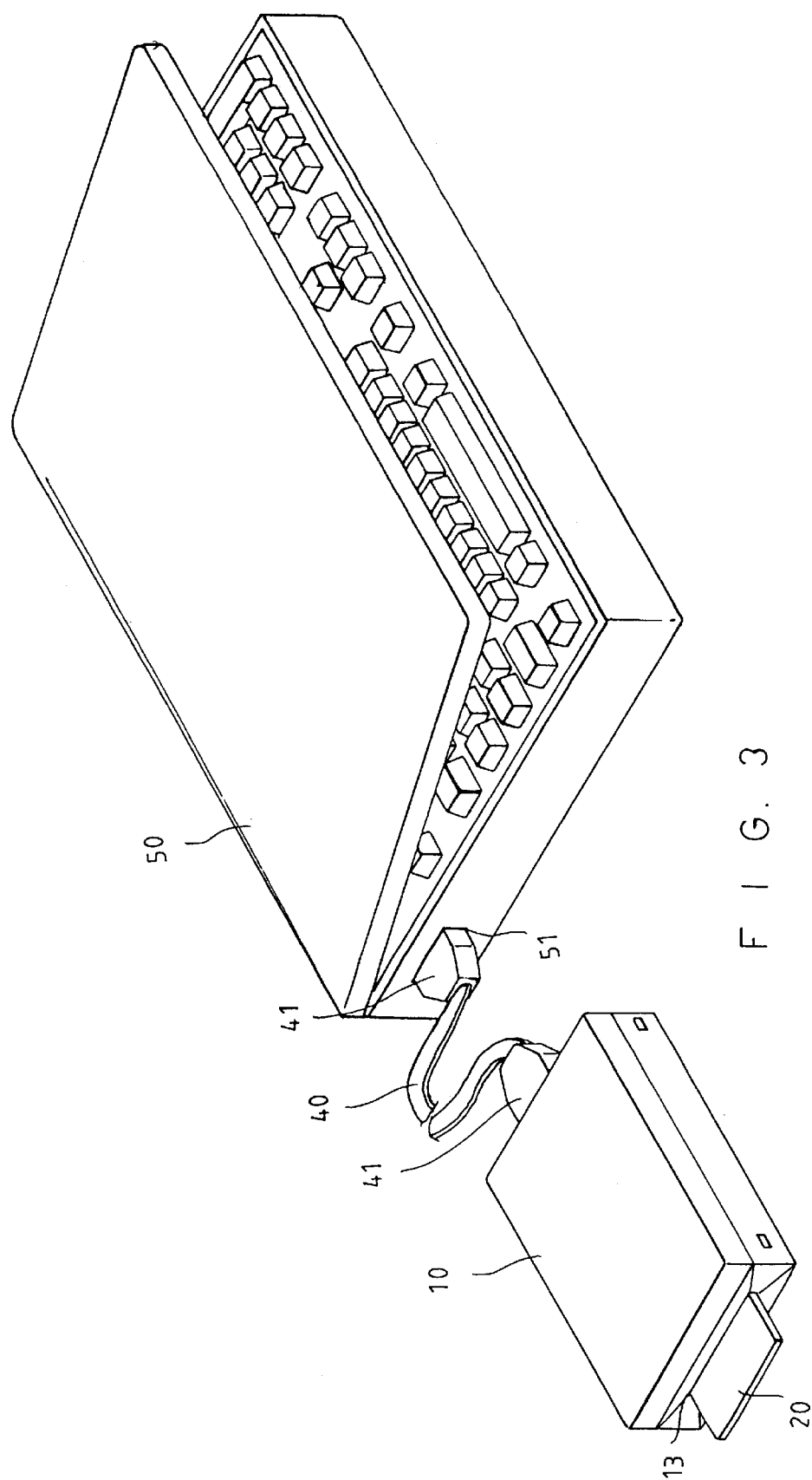
FIG. 3 is an isometric drawing of the most preferred embodiment of the invention herein.
Figure 4:
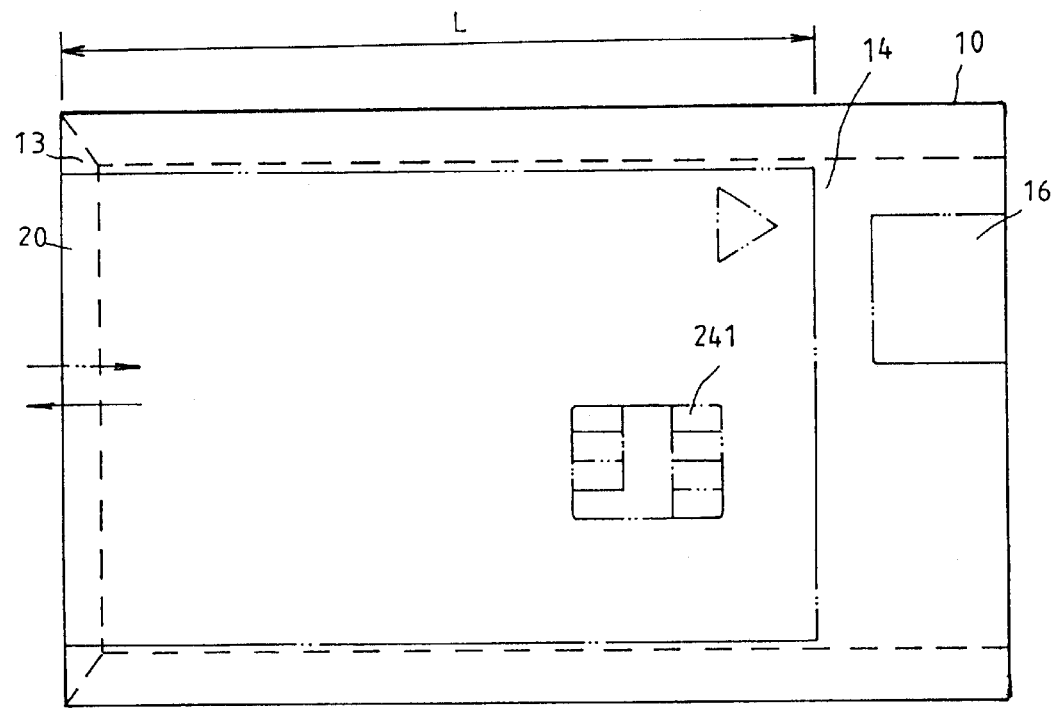
FIG. 4 is an orthographic drawing of the memory card of the invention herein shown in the housing cavity.

Referring to FIG. 2 and FIG. 3, the computer-dedicated auxiliary data access device of the invention herein is comprised of a device case 10, a number of memory cards 20, a card terminal connector 30, and a transmission cable 40, of which;

The said device case 10 consists of an upper cover 11, a lower base 12; a pair of hook-shaped clasp section 111 projects from the left and right sides along the bottom edge of the said upper cover 11; the said lower base 12 is congruent with the box-like profile of the said upper cover 11, with a pair of insert recesses 121 formed in the left and right sides that accommodate positioning of the clasp sections 111, thereby enabling a conjoined assembly; a horizontal slot 13 approximately 5.4 cm in width is disposed through the front side of the said lower base 12 and, as indicated in FIG. 4, a housing cavity 14 is perpendicularly formed inward to a depth of approximately 8 cm beyond the said horizontal slot 13 and a locating plate 15 spread over the upper extent of said housing cavity 14; a rectangular opening 151 is formed in the said locating plate 15 and an arresting element 152 projects horizontally at a suitable distance from the rear end of the said opening 151; and a universal serial bus (USB) interface socket 16 is mounted at the end section of the said housing cavity 14.

Each the said memory cards 20 are ultra thin oblong components similar in physical structure to calling cards and are approximately 0.08 cm thick, with the width 22 being equivalent to that of the said horizontal slot 13, thereby enabling sideways insertion through the horizontal slot 13 of the device case 10 and into the said housing cavity 14; each memory card 20 internally consists of high-speed flash memory chips 23 and also includes a main controller IC 231 and memory IC 232, with the latter IC have a read/write specification of 10,000 times, enabling the rapid reading and writing of data, a read access area 24 is formed on the top surface of the said memory card 20 and a plurality of contacts 241 are intervallicly disposed along the said read access area 24.

The said card terminal connector 30A is box-shaped and consists of an IC circuit board 30A that is in parallel alignment with the said horizontal slot 13, its end surface 31 inserted downward into the opening 151 of the said locating plate 15 and, furthermore, through the said housing cavity 14 onto the read access area 24 of the memory card 20 such that the tensile ends rest flush against the elastically loaded plurality of contacts 241, thereby enabling a perpendicular posturing against the contacts 241 of the said read access area 21 that provides connectivity for signal reading operations in conjunction with the flat cable 31 extending laterally from the said card terminal connector 30 is connected to the interface socket 16 of the said device case 10.

The said transmission cable 40 is of USB design, with the connection terminals 41 at one end installed to the interface socket 16 of the said device case 10 and the connection terminals 41 at the other end, as indicated in FIG. 3, installed to the USB port 51 of a computer 50, which enables the electrical connection between the computer 50 and the said device case 10 required for rapid data output and input.

When the said components are assembled to complete the computer-dedicated auxiliary data access device of the invention herein, the hook-shaped clasp sections 111 of the said upper cover 11 are fitted into the insert recesses 121 of the lower base 12, as indicated in FIG. 2, with the completed device case 10 of the invention herein appearing as shown in FIG. 3; referring to FIG. 3, for utilization, the connection terminals 41 of the transmission cable 40 are respectively installed to the interface socket 16 of the device case 10 and the USB port 51 of the computer 50, thereby completing the assembly and operational installation of the invention herein.

Figure 5:
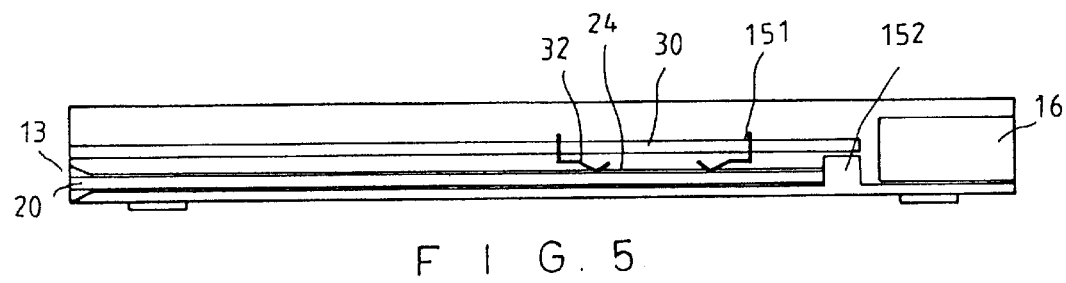
FIG. 5 is an orthographic drawing of the memory card of the invention herein situated against the card terminal connector.

Referring to FIG. 4 and FIG. 5, when utilization is desired, the memory card 20 is inserted into the said horizontal slot 13, with inner end of the ultra thin said memory card 20 guided through the horizontal slot 13 quickly reaching and becoming stopped by the arresting element 152 at the bottom section of the said housing cavity 14, at which time, since the lower aspect of the card terminal connector 30 is inserted downwards and exposed at the locating plate 15 of the opening 151, the spring contacts 32 protruding from the end surface of the said card terminal connector 30 constantly press against the contacts 241 intervallicly situated along the read access area 24 on the top surface of the said memory card 20; therefore, the read access area 24 of the said memory card 20 is situated flush against the spring contacts 32 of the card terminal connector 30 enable rapid signal transmission recording during the operation of the computer 50.

Since the device case 10 connected to the computer 50 has a horizontal slot 13 that provides for the non-vertical insertion of the ultra thin design memory card 20 and, furthermore, the card terminal connector 30 is oriented parallel to the said housing cavity 14 such that its plurality of spring contacts 32 press downward perpendicularly under elastic tension to establish connective contact, rapid transmission and recording is achieved during computer operation; and in regards to repeated operation usage, due to the resulting arrangement of the device case 10 and the memory card 20, each memory card 20 is capable of more than 10,000 read-write operations, which offers the advantage of considerably prolonging service life compared to prior art structures; furthermore, since more memory capacity is available which allows for even greater flexibility in that it is only necessary to use a memory card 20 of higher capacity to achieve user objectives, without being subject to limits of conventional disk drive operations involving a number of double-sided high density diskettes, therefore, the invention herein reduces additional peripheral equipment purchasing costs, to the extent of even completely replacing existent floppy disk operations methods, and provides for mobile auxiliary memory operations; furthermore, since the assembled device case 10 of the invention herein is mobile and the ultra thin, calling card sized memory cards 20 occupy minimal space, greater portability, upkeep, and storage convenience is facilitated In summation of the foregoing section, the technological concept of the structure as well as the innovative spatial configuration of the computer-dedicated auxiliary data access device of the invention herein is capable of overcoming the shortcomings of the prior art and, furthermore, possesses more functional practicality than the conventional products.

What is claimed is:

1. A computer-dedicated auxiliary data access device comprised of a device case having a minimum of one horizontal slot in the front side and, furthermore, a housing cavity perpendicularly formed inward beyond the said horizontal slot, a universal serial bus (USB) interface socket installed at the end section of the said housing cavity, an IC circuit board disposed in parallel alignment with the said horizontal slot, a card terminal connector respectively situated at the end face of the said IC circuit board, and a number of perpendicularly supportive spring contacts of said card terminal connector that are connected via a flat cable routed to the said interface socket; the said horizontal slot provides for the sideways insertion of an ultra thin flat memory card; the said memory card internally consists of high-speed flash memory chips and also includes a main controller IC and a memory IC which have a read/write specification of 10,000 times to enable the rapid reading and writing of data; an exposed read access area is formed in the top of the said memory card that is in parallel alignment with the said card terminal connector, the said read access area consisting of an elastically loaded plurality of contacts intervallicly disposed that enable perpendicular mutual engagement; a transmission cable is installed to said interface socket and the other end is installed to the USB port of a computer; as such, the present invention achieves computer-dedicated high speed and high capacity auxiliary memory access operations, while providing for convenient portability and maintenance.

2. As mentioned in claim 1 of the computer-dedicated auxiliary data access device of the invention herein, an arresting element projects horizontally from bottom side of the said housing cavity, limiting further inward movement of the sideways and perpendicularly inserted said memory card.

3. As mentioned in claim 1 of the computer-dedicated auxiliary data access device of the invention herein, the optimal dimensions of the width of the said horizontal slot and the depth of the said housing cavity perpendicularly formed inward is 5.4 cm and 8 cm, respectively, and a locating plate is spread over the upper extent.

\* \* \* \* \*